United States Patent
Cohen et al.

(10) Patent No.: US 12,497,305 B2
(45) Date of Patent: Dec. 16, 2025

(54) HOT AND COLD WATER DISPENSER WITH FILTER FOR WEEKDAY AND SABBATH AND METHOD

(71) Applicants: Shemon Cohen, Ashkelon (IL); Itamar Cohen, Ashkelon (IL); S.B.I.D Solutions, Enterprise and Investments Ltd., Ashkelon (IL)

(72) Inventors: Shemon Cohen, Ashkelon (IL); Itamar Cohen, Ashkelon (IL)

(73) Assignees: Shemon Cohen, Ashkelon (IL); Itamar Cohen, Ashkelon (IL); S.B.I.D Solutions, Enterprise and Investments Ltd., Ashkelon (IL)

( * ) Notice: Subject to any disclaimer, the term of this patent is extended or adjusted under 35 U.S.C. 154(b) by 512 days.

(21) Appl. No.: 17/796,684

(22) PCT Filed: Feb. 1, 2021

(86) PCT No.: PCT/IB2021/050780
§ 371 (c)(1),
(2) Date: Aug. 1, 2022

(87) PCT Pub. No.: WO2021/152561
PCT Pub. Date: Aug. 5, 2021

(65) Prior Publication Data
US 2023/0159350 A1    May 25, 2023

(30) Foreign Application Priority Data

Jan. 30, 2020    (IL) .......................................... 272387

(51) Int. Cl.
*C02F 1/00*    (2023.01)
*B01D 29/15*    (2006.01)
(Continued)

(52) U.S. Cl.
CPC .............. *C02F 1/008* (2013.01); *B01D 29/15* (2013.01); *B01D 29/33* (2013.01); *B01D 35/147* (2013.01);
(Continued)

(58) Field of Classification Search
CPC .......... C02F 1/008; C02F 1/001; C02F 1/283; C02F 1/325; C02F 1/68; C02F 9/20;
(Continued)

(56) References Cited

U.S. PATENT DOCUMENTS

| 4,909,937 A | 3/1990 | Hoffmann et al. |
| 7,182,804 B2 | 2/2007 | Gieseke et al. |

(Continued)

FOREIGN PATENT DOCUMENTS

| EP | 0001101 | 3/1979 |
| EP | 2467332 | 5/2013 |

(Continued)

OTHER PUBLICATIONS

Office Action Dated Sep. 5, 2024 From the Israel Patent Office Re. Application No. 307547. (7 Pages).
(Continued)

*Primary Examiner* — Terry K Cecil

(57) ABSTRACT

A water filter device for filtering water for supply, consists of an outer housing, a general water inlet through the housing, a mechanical filter within the housing, a carbon filter within the housing and a general water outlet through the housing, the filter device providing a flow path from the general water inlet, through the mechanical filter and the carbon filter to the general water outlet. The water filter device further includes a secondary water inlet through the housing between the mechanical filter and the carbon filter, to provide a second flow path from the secondary water inlet
(Continued)

through the carbon filter to the general water outlet, the second flow path thus bypassing the mechanical filter.

21 Claims, 5 Drawing Sheets

(51) Int. Cl.
| | |
|---|---|
| *B01D 29/33* | (2006.01) |
| *B01D 35/147* | (2006.01) |
| *B01D 36/02* | (2006.01) |
| *C02F 1/28* | (2023.01) |
| *C02F 1/32* | (2023.01) |
| *C02F 1/68* | (2023.01) |
| *C02F 9/20* | (2023.01) |

(52) U.S. Cl.
CPC .............. *B01D 36/02* (2013.01); *C02F 1/001* (2013.01); *C02F 1/283* (2013.01); *C02F 1/325* (2013.01); *C02F 1/68* (2013.01); *C02F 9/20* (2023.01); *B01D 2201/54* (2013.01); *C02F 2209/005* (2013.01); *C02F 2209/44* (2013.01); *C02F 2301/043* (2013.01)

(58) Field of Classification Search
CPC ............ C02F 2209/005; C02F 2209/44; C02F 2301/043; B01D 29/15; B01D 29/33; B01D 35/147; B01D 36/02; B01D 2201/54; B01D 27/148; B01D 24/007; B01D 25/00; B01D 29/56
See application file for complete search history.

(56) References Cited

U.S. PATENT DOCUMENTS

| | | | | |
|---|---|---|---|---|
| 7,455,769 | B2* | 11/2008 | Heitele | B01D 29/54 |
| | | | | 210/418 |
| 7,974,527 | B1* | 7/2011 | Adler | F24H 1/185 |
| | | | | 99/275 |
| 8,888,963 | B2 | 11/2014 | Kamen et al. | |
| 9,707,330 | B2* | 7/2017 | Kelly | A61M 1/1696 |
| 10,822,249 | B2 | 11/2020 | McDonald et al. | |
| 2002/0195384 | A1 | 12/2002 | Rohrbach et al. | |
| 2009/0103907 | A1* | 4/2009 | Nave | F24D 19/1051 |
| | | | | 392/463 |
| 2014/0190990 | A1* | 7/2014 | Raoven | B67D 3/0045 |
| | | | | 222/64 |

FOREIGN PATENT DOCUMENTS

| | | |
|---|---|---|
| WO | WO 97/06879 | 2/1995 |
| WO | WO 2007/133676 | 11/2007 |
| WO | WO 2021/152561 | 8/2021 |

OTHER PUBLICATIONS

Office Action Dated Apr. 16, 2024 From the Israel Patent Office Re. Application No. 307547. (7 Pages).
International Search Report and the Written Opinion Dated May 20, 2021 From the International Searching Authority Re. Application No. PCT/IL2021/050780. (19 Pages).
Office Action Dated Jun. 19, 2022 From the Israel Patent Office Re. Application No. 272387. (4 Pages).
Office Action Dated Feb. 23, 2023 From the Israel Patent Office Re. Application No. 272387. (3 Pages).
Office Action Dated Jan. 27, 2025 From the Israel Patent Office Re. Application No. 307547. (5 Pages).

\* cited by examiner

HOT AND COLD WATER DISPENSER WITH FILTER FOR WEEKDAY AND SABBATH AND METHOD

RELATED APPLICATIONS

This application is a National Phase of PCT Patent Application No. PCT/IB2021/050780 having International filing date of Feb. 1, 2021, which claims the benefit of priority of Israel Patent Application No. 272387 filed on Jan. 30, 2020. The contents of the above applications are all incorporated by reference as if fully set forth herein in their entirety.

FIELD AND BACKGROUND OF THE INVENTION

The present invention, in some embodiments thereof, relates to a water dispenser and, more particularly, but not exclusively, to domestic or commercial scale hot and cold water dispensers, soda dispensers and combined water and soda dispensers.

Water heaters, hot water and drinks dispensers, soda dispensers and the like generally include internal controls that operate during the normal functioning of the dispenser. Alternatively or additionally the dispenser may be controlled intelligently either using an internal processor or by smart building or smart home controllers to operate as needed, according to timetables, according to user presence or motion and in other ways. Thus a dispenser that is part of a smart building system may keep water hot as long as people are present in the vicinity, at other times saving energy by not heating the water or by keeping the water at a lower, maintenance, temperature.

In addition, water provided by such a dispenser may be filtered and purified prior to being dispensed to sterilize the water, and remove dirt and scale. Generally speaking, dirt is removed using a mechanical filter, sterilizing is carried out by passing the water past a bank of Ultra-violet Radiation sources, for example UV lamps or UV LED's, and a carbon filter may remove chlorine and volatile compounds. A polyphosphate filter may remove salts and minerals and is typically used for hot water only to reduce the scale in the water.

Applicant's co-pending Israel Patent Application No. 264,918 filed 19 Feb. 2019, relates to a hot and cold water dispenser and method that addresses issues of heating the water and carrying out electrical switching. Such issues pose a problem for observant Jews, who regard electrical switching and direct intentional causation of switching on holy days such as the Sabbath and festivals as forbidden, there being some debate as to what is considered as direct causation. The use of smart control itself is not a problem, as timetable-based operation is perfectly acceptable, however anything where switching is consequent on a conscious action of the user is undesirable.

In a standard hot drink dispenser, the drawing of water leads to emptying of the hot tank and its filling with cold water which then needs to be heated. Aside from the use of electricity, cooking on the Sabbath is forbidden, so that unless the hot water was heated prior to the onset of the Sabbath, use of the hot water is regarded as forbidden irrespective of how it was heated. On a festival day which is not also a Sabbath, heating of the water as such is allowed, and the only issue is the switching of electricity by the user, so that if dispensing of the hot water leads directly to heating in the tank it is problematic, but not otherwise. Heating of the water based on proximity sensing would be problematic both on the Sabbath and on a weekday festival.

That document thus discloses a hot and cold water dispenser having a water inlet, a hot water tank for heating water, a heater for the tank, an optional cold water outlet, a hot water outlet, and a controller for operating the water heater. The controller confers on the dispenser Sabbath and festival operational modes in which, at a predetermined time prior to a Sabbath onset time, the tank is filled and heated, and over a duration extending from the Sabbath or festival onset time until a Sabbath or festival end time, a water temperature in the tank is maintained, for example by operating the water heater at preset intervals. A sensor detects a tank empty condition of the hot water tank and the Sabbath operation mode comprises a function to stop operating the heater on the empty tank. The festival mode allows refilling and heating of the tank. Entry into Sabbath or festival mode may entail disabling of electrical valves and/or pumps at the dispensing end and enabling of hand operated taps.

However, filtering of the water is also an issue that raises issues of operation on the Sabbath, since on the Sabbath it is not permitted to use a mechanical sieve and some authorities do not allow any kind of filtering. The present disclosure addresses the issue of Sabbath and festival modes of operation that concern the filtering of the water for dispensing either as hot water or as cold water. The issues are not restricted to dispensers but may apply to point of entry filtering systems that filter all the water entering a house or other building or any other water filtering systems.

SUMMARY OF THE INVENTION

The present embodiments relate to supply of hot (and if required cold) water, particularly, from a dispenser that is able to provide hot water, and if required cold or chilled water and soda. The water is filtered in the normal way during the week, and is also provided on the Sabbath or a festival in a way that a Sabbath observer may use the water, both hot and cold. Furthermore embodiments provide configurable options for those taking a more stringent line on the kinds of filtering permitted, and the present embodiments may extend to any water supply having a filter and which provides a way of supplying the water which does not infringe on the keeping of the Sabbath.

Thus, the present embodiments may have a Sabbath mode, a weekday festival mode and a weekday mode. In the weekday mode, water is filtered using all available filters, which may include a mechanical filter, ultra-violet radiation source, a carbon filter and water to be heated is passed through a polyphosphate filter. In the Sabbath mode the hot tank is filled in sufficient time prior to the Sabbath to heat the water before the Sabbath and no further water is added to the hot tank, so that the polyphosphate filter is not used. In the weekday festival mode, by contrast, water is added to the hot tank and thus the polyphosphate tank is used. The mechanical filter and the ultra-violet radiation source are not used on the Sabbath or on weekday festivals. The carbon filter is used on the Sabbath and on weekday festivals except in an extra-stringent configuration where it too is bypassed.

The setting of the water dispenser into its respective modes may be automatic. Time switches that operate on a weekly basis are available. However the Sabbath starts and ends at different times each week as its hours are determined by local sunset times. Secondly, there are, in addition to the weekly Sabbath, eight or fifteen festival days on which the same issues apply, their dates being determined according to the Hebrew calendar.

The present embodiments may thus use microprocessor control to switch the mode of operation between the weekday mode, the Sabbath mode and the weekday festival mode, based on the Hebrew calendar and a knowledge of the local time and location.

A touch screen may be used to set the location, thus indirectly setting the times. Alternatively the times may be set directly, as desired.

In any smart device, a microprocessor with the time and date is generally present and thus the entire functionality of the three modes may be applied using software. According to an aspect of some embodiments of the present invention there is provided a water filter device for filtering water for supply, the filter comprising an outer housing, a general water inlet through said housing, a mechanical filter within said housing, a carbon filter within said housing and a general water outlet through said housing, the filter device providing a flow path from the general water inlet, through the mechanical filter and the carbon filter to the general water outlet, the water filter device comprising a secondary water inlet through said housing between said mechanical filter and said carbon filter, the filter device providing a second flow path from the secondary water inlet through the carbon filter to the general water outlet, the second flow path thereby bypassing the mechanical filter.

An embodiment may comprise a polyphosphate filter.

In an embodiment, the general water outlet is upstream of the polyphosphate filter, the device having a polyphosphate filter inlet and a polyphosphate filter outlet providing a third flow path through the polyphosphate filter.

Embodiments may include an ultra-violet source for sterilizing water, the source operated by drawing of water, the source being deactivated in a Sabbath mode. The ultra-violet source may be a UV lamp of any kind including a UV LED.

According to another aspect of the present invention there is provided a water supply unit for supplying water for dispensing as hot and cold water, comprising:
 a water inlet;
 a water filter device for filtering water for supply, the filter comprising an outer housing, a general water inlet through said housing, a mechanical filter within said housing, a carbon filter within said housing and a general water outlet through said housing, the filter device providing a flow path from the general water inlet, through the mechanical filter and the carbon filter to the general water outlet, the water filter device comprising a secondary water inlet through said housing between said mechanical filter and said carbon filter, the filter device providing a second flow path from the secondary water inlet through the carbon filter to the general water outlet, the second flow path thereby bypassing the mechanical filter; and
 first and second valves controllable to supply said general water inlet in a weekday operating mode and to close said general water inlet and supply said secondary water inlet in a Sabbath or Festival operating mode.

An embodiment may include a hot water tank, controllably connected via a valve to said filter device to be supplied with water in said weekday mode, but not supplied with water for heating in said Sabbath mode.

The hot water tank may be controllably connected via said valve in a festival mode to be filled on a tank empty condition.

Embodiments may include a polyphosphate filter.

In an embodiment, the general water outlet is upstream of the polyphosphate filter, the device having a polyphosphate filter inlet and a polyphosphate filter outlet providing a third flow path through the polyphosphate filter.

An embodiment may comprise at least one ultra-violet source for sterilizing water, the ultra-violet source operated by drawing of water, the source being deactivated in a Sabbath mode.

Embodiments may comprise a controllable bypass for completely bypassing said water filter device.

Embodiments may comprise a hot tank level reduction sensor for detecting a low water condition of said hot water tank, wherein said Sabbath operation mode comprises a function to stop operating said heater under said low water condition, and a festival mode operation comprises a function to fill said tank under said low water condition.

Hot and cold water outlets may use electronically operated valves bypassed by mechanical taps, said electronic valves being controllable to be disabled in said Sabbath mode.

The mechanical taps may comprise solenoids to disable said mechanical tap in said weekday festival mode while water in said tank is being heated by said heater and/or while said tank is being filled.

The controller may be part of a smart building control system.

The water supply unit may be a self-standing water dispenser.

The water supply unit may have a user screen, the controller displaying information on said screen.

The water supply unit may comprising a chiller unit for dispensing chilled water.

In an embodiment, said chiller unit is connected to said water inlet via said mechanical filter, said installation of ultra-violet radiation sources and a carbon filter in said weekday mode, said connection bypassing said mechanical filter in said Sabbath mode.

Embodiments may include a soda attachment for carbonating cold water prior to dispensing.

A sterilization function may be provided in which water is held at boiling temperature for a predetermined interval, thereby to provide sterile water, say for safely preparing baby food.

A sterile tank may allow for cooling of the sterile water.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
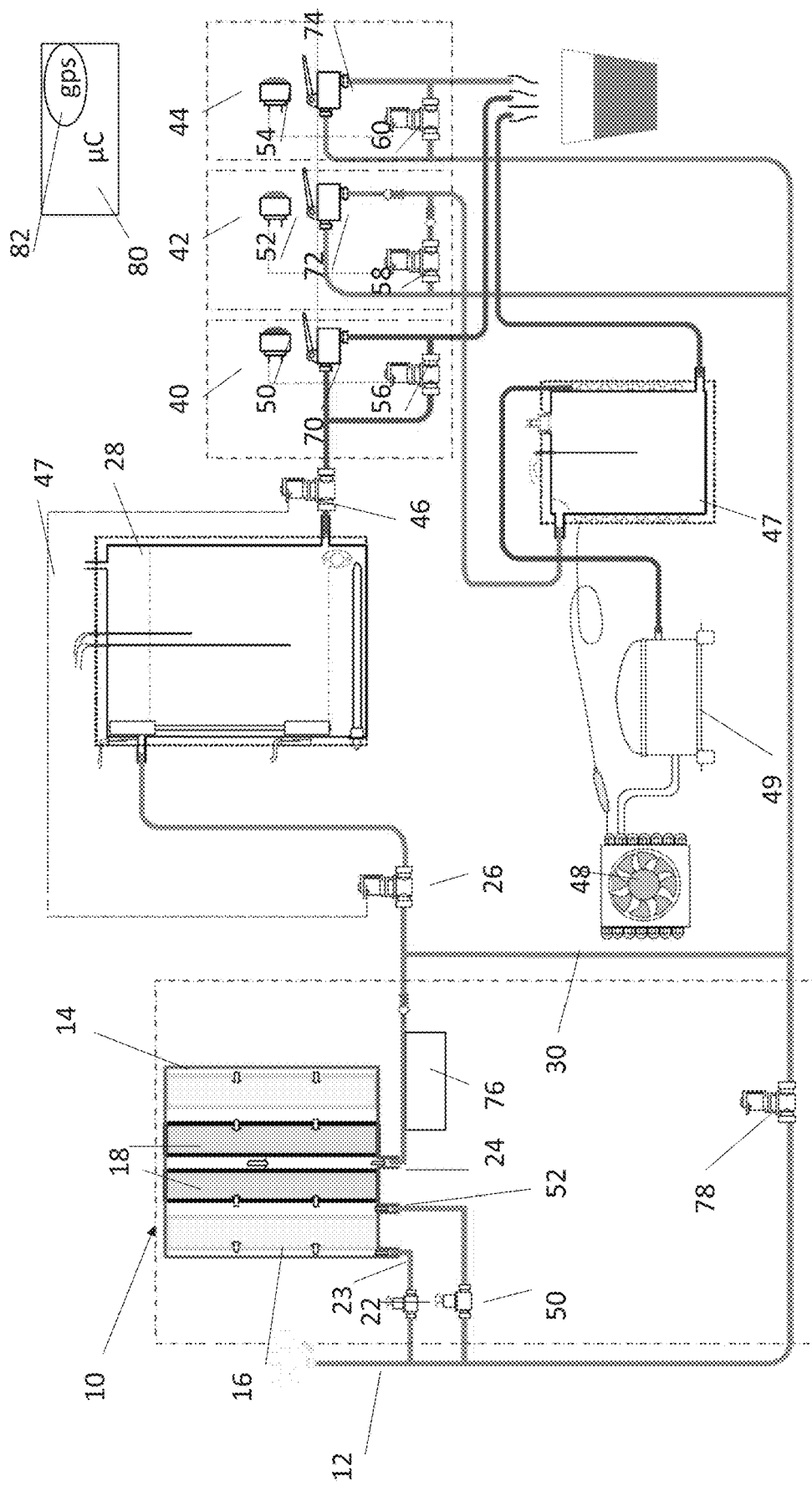
FIG. 1 is a simplified diagram showing a hot and cold water supply unit with alternative piping routes for Sabbath and weekday operational modes according to an embodiment of the present invention.

The present invention, in some embodiments thereof, relates to a water dispenser and, more particularly, but not exclusively, to domestic or commercial scale hot and cold water dispensers, soda dispensers and combined water and soda dispensers.

The present embodiments relate to water supply units that filter and heat or cool water for uses such as drinking and cooking, particularly in the domestic context and in the hospitality industry. For the Sabbath observant, both the heating operation and the filling of cold water for subsequent heating are operations may be problematic if using human input on the Sabbath itself. In addition, filtering of the water using different filtering techniques may be problematic, certain other techniques being allowable according to most but not all interpretations. In addition, the use of ultra-violet light to sterilize the water is problematic as the ultra-violet radiation source is switched on at the time that the water flow and thus by the action of turning on the tap. The present embodiments may thus e provide a pre-Sabbath operation in which at least some of the filtering operation is bypassed, wherein an operation carried out a predetermined time prior to Sabbath onset, of filling and heating the hot water tank is carried out, and in which the ultra-violet light is switched off. Then in Sabbath operation, the water is maintained at a hot temperature but no cold water is drawn into the hot water tank, and dispensing of the hot water does not cause any measurement or heating operation to occur. In the Sabbath mode of operation, if necessary, any electrically operated buttons for dispensing water, if present, are inactivated and mechanical taps operate instead. A valve prevents filling with water from the municipal water source, and the water temperature is maintained by operating at predetermined intervals. Any thermostat is either disabled or its signals are ignored. In an embodiment, the thermostat signal to initiate heating is ignored but the thermostat signal to switch off heating when the desired temperature is reached is used. In an embodiment, a mechanical float may be used to sense the water level in the tank and when a minimum level is reached so that no further water can be drawn, the heater is fully switched off to avoid burning out the element. In an alternative version the point from which the water is drawn is above the element so that the element is always covered.

For operation on a weekday festival, filling with cold water for subsequent heating is allowed, as long as there is no direct connection between the dispensing operation and the heating operation. Thus a weekday festival mode may be defined in which dispensing hot water does itself not cause any heating to occur. However, once dispensing of water is over and a tank empty condition is detected, cold water is drawn to replace the water that has been used and refill the tank. In an embodiment, water is not drawn while heating has been completed. Drawing of cold water may take place automatically when the level in the tank falls to a predetermined threshold, and the level may be measured using the level of a float. The filtering bypass may typically be maintained.

Thus a hot water dispenser according to the present embodiments may have separate modes of operation for pre-Sabbath onset, Sabbath, and weekday festivals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which shows a water supply unit 10 for supplying water to a water dispenser or for that matter for the domestic supply. Water is provided for dispensing as hot and cold water.

A water inlet 12 supplies water. An installable water filter 14, here provided as a cylinder, includes a mechanical filter 16 which forms an outer ring of the cylinder. A carbon filter 18 forms an inner ring of the cylinder.

Figure 2:
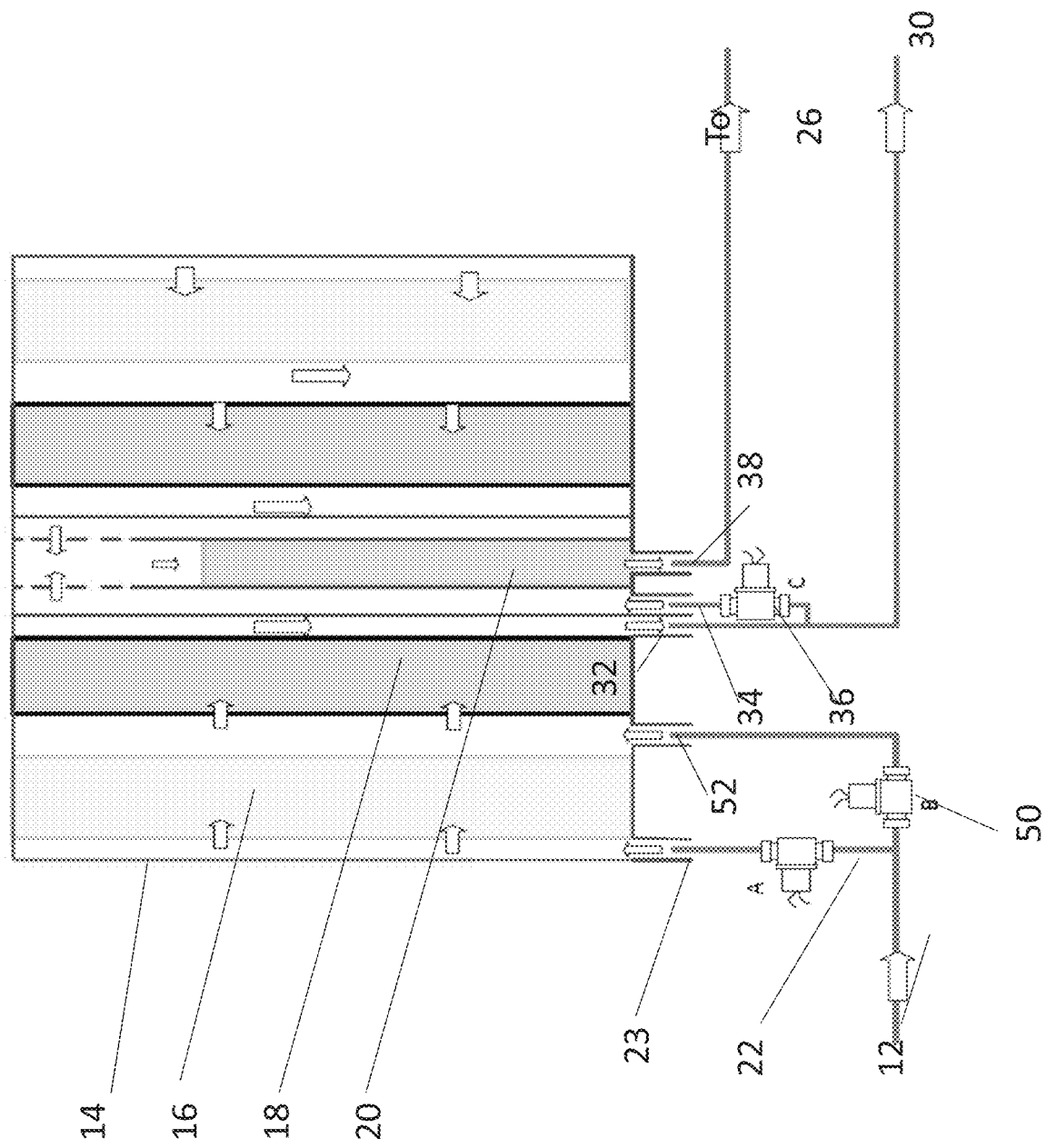
FIG. 2 is a simplified diagram showing alternative water pipe routes through the filter of FIG. 1, according to an embodiment of the present invention.

FIG. 2 shows a variation of the installable water filter 14 which includes the mechanical filter 16 and the carbon filter 18 but in addition includes a central column 20 which provides a polyphosphate filter. The polyphosphate filter is to remove scale and is only needed for hot water so that the cold water supply may bypass the polyphosphate filter. In addition a UV illumination source may be provided to sterilize the water.

Figure 3:
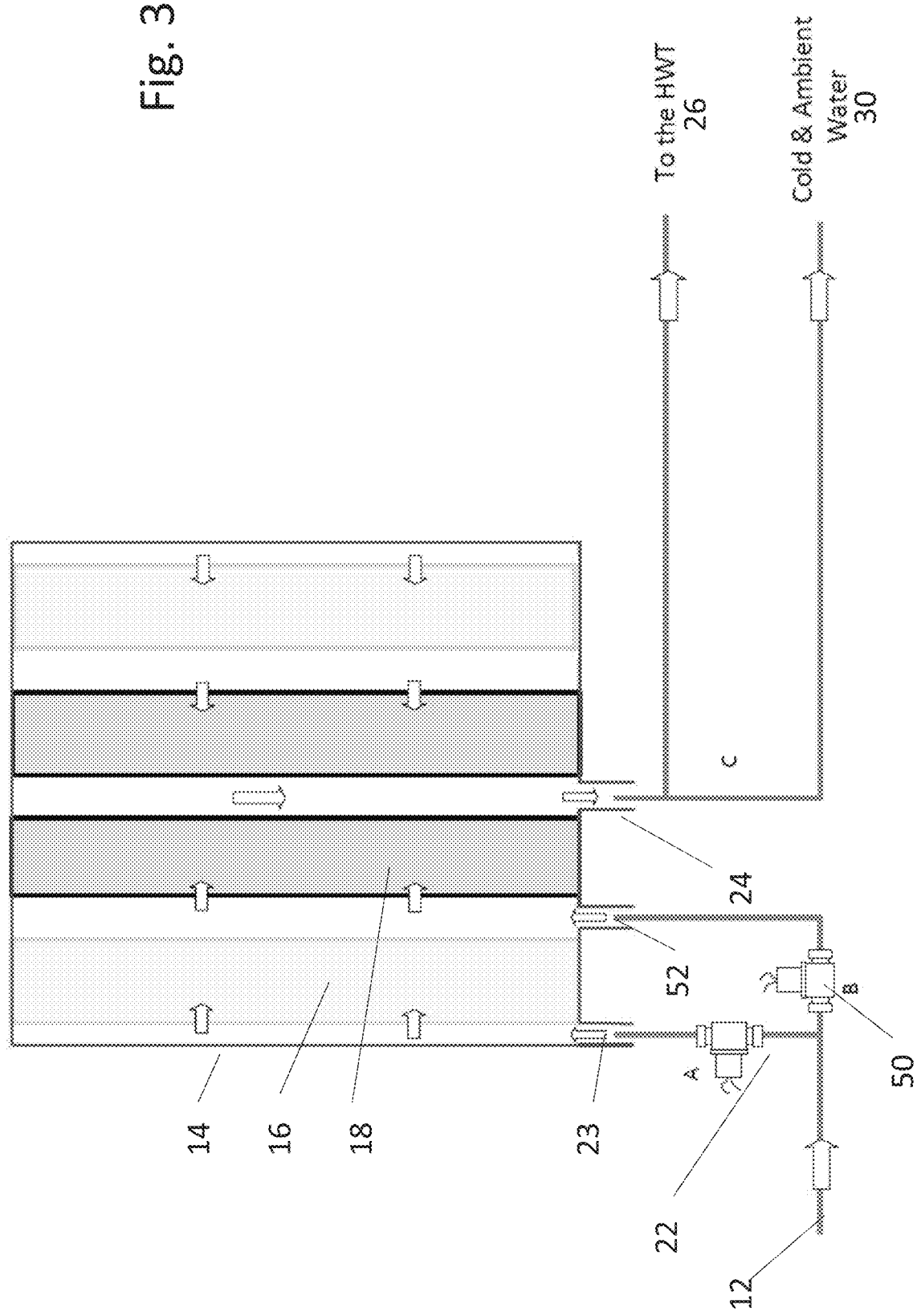
FIG. 3 is a simplified diagram showing a variation of the water piping routes of FIG. 2, according to embodiments of the present invention.

FIG. 3 is a detail of the installed filter of FIG. 1 with the mechanical 16 and carbon 18 filters but without the polyphosphate filter.

In the following the installable water filter of FIG. 2 will be referred to as the triple filter, and the installable water filter of FIG. 3 will be referred to as the double filter.

In normal weekday use, water enters either the double or the triple filter 14 via controllable valve 22 which is open, and general filter input 23. The water circulates through the mechanical filter 16 and then through the carbon filter 18. In the double filter the water then exists through filter outlet 24 where some of the water goes via valve 26 to hot tank 28 for heating and the remainder goes through pipe 30 to form the cold water supply.

In the triple filter, as shown in FIG. 2, the hot and cold water supplies are split up at the filtering stage, since the polyphosphate filter is only used for water that is to be heated. In the triple filter water enters the filter via valve 22, and general filter inlet 23, as before and goes through the mechanical 16 and carbon 18 filters and then exists at filter general outlet 32, which continues to the cold water supply 30. Some of the water is taken off at valve 34 and reenters the filter at input 36 to go through the polyphosphate filter 20. The water from the polyphosphate filter exits at second filter output 38 to provide a scale-free supply for the hot water.

In general, the water is dispensed via hot 40, chilled 42 and ambient cold 44 dispensing systems. The hot dispensing system receives hot water from the hot water tank 28 via valve 46. Valve 46 is normally open and is closed at a time during the weekday festival when water is being heated so that drawing of water during heating is prevented.

Loop 47 allows for internal circulation around the hot water tank. The chilled water dispensing system receives chilled water from a chiller system which includes cold water tank 47 and a condenser 48 and compressor 49.

A function may be provided, in the weekday operation, to provide a sterilization function in which the hot water is fully boiled and, as desired, kept at boiling point for a preset time. Such a function may be useful for preparing food for babies, or for sterilizing vessels for any reason.

The sterilization function may be used with a sterile tank in which the sterilized water may be stored, for example to cool to a temperature suitable for preparation of baby food. In one embodiment, the sterile tank may include a cooling element.

A further function, in the weekday operation mode, may allow the user to define a desired temperature, and the controller determines a suitable mix of hot and ambient or cold water to achieve the desired temperature.

Each dispensing system includes an electronic button 50, 52, 54 which operates a corresponding dispensing valve 56, 58, 60.

The water supply 10 according to the present embodiments has a mode for the Sabbath and festivals, referred to herein as the Sabbath mode. There is a difference between operation on Sabbath and on a weekday festival which will be explained hereinbelow but most of the functions are the same.

The first difference is that of bypassing the mechanical filter 16. Valve 22, which is normally open, is closed for the Sabbath mode, say by using an electronically operated latch. Instead a normally closed Sabbath bypass valve 50 is opened, again for example using an electronically operated latch. Water thus enters the installed filter 10 via bypass input 52, hence bypassing the mechanical filter 16 and going straight to the carbon filter 18. Irrespective of the filter path, in the Sabbath mode, cold water is not supplied to the hot water heater 28, so that the valve 26 is closed. In the triple filter, valve 36 may also be closed, thus bypassing the polyphosphate filter.

The hot tank may continue to supply hot water during the Sabbath, but only from water that has been heated prior to the Sabbath. In one embodiment, the hot water tank is filled and heated immediately prior to the onset of the Sabbath.

In festival mode, the hot water tank may be filled with cold water, and the cold water may be heated, as long as the filling and heating is not directly connected to drawing of the water by the users.

In addition, in the Sabbath mode, the electronic switches 50, 52 and 54 are deactivated. Instead, mechanical taps 70, 72 and 74 may be used. In an embodiment, a solenoid may be positioned around the mechanical tap to disable operation of the mechanical tap during the standard operating mode, namely during week.

The same solenoid may be operated to disable the mechanical tap during a festival day which is not a Sabbath day while water is being heated or while the tank is being filled.

In an embodiment an installation of ultra-violet radiation sources 76 may be used in the weekday mode to sterilize the incoming water. In an embodiment, the radiation sources are located as close to the output as possible. The UV Radiation sources are switched on during the movement of water as the water is drawn. In the Sabbath mode the radiation sources are switched off.

For those following a stricter interpretation of Sabbath observance, a general bypass valve 78 is provided which bypasses the entire filter installation.

The system may be operated using microcontroller 80. A microcontroller has a clock with a date and time, and may use the date and time, along with a knowledge of the location of the water system, to calculate Sabbath onset times and festival days. The microcontroller 80 may be provided with the location or may include GPS or like location hardware. That is to say, the microcontroller may in embodiments be associated with a location interface 82 which determines the dispenser's location. In one embodiment the interface may obtain the location information from user input. Alternatively the location interface may obtain the location information from an Internet service such as the user's Google™ account. As a further alternative the location interface may obtain the information using GPS or cellular information. Location information may then be used in conjunction with the clock in the microcontroller 80 to calculate local Sabbath and festival start and end times.

In embodiments, the controller is part of a smart building control system, so that a connection such as wifi or Bluetooth™ connection is used to link the microcontroller 82 with other parts of a network within the building. In this way the water system may be either a master or slave component of the smart building control.

The dispenser may have a user screen, and microcontroller 80 may display information on the screen and allow the user to program the dispenser. In the case where the dispenser is a master component of a smart building control system the user may be able to use the screen to program smart control for the entire building or for part of the building.

In embodiments a soda attachment may provide a pressurized tank to which carbon dioxide containers may be attached. Thus the dispenser may carbonate cold water prior to dispensing.

In general the act of carbonating water is not regarded as desecrating the Sabbath, however some take a stricter view. Thus, in an embodiment the Sabbath operational mode includes a function for carrying out carbonating of water at preset intervals, rather than relying on user action.

A tank may be provided to dispense flavored water or specified drinks. These may be chilled or not as desired.

Embodiments may provide an attachment location for a beer barrel. In general, beer containers are relatively large and so the attachment may be below the level of the relevant dispensing tap. In such a case, a pump is provided that may pump beer from the barrel for dispensing, however use of such a pump may be a desecration of the Sabbath. Thus for the purposes of the Sabbath mode of operation, a typically smaller intermediate tank is placed above the level of the dispensing tap. As the dispenser enters Sabbath or festival mode, the pump operates to pump beer to fill the intermediate tank, and then during the Sabbath or the festival, beer can be dispensed without using the pump.

One may summarize the Sabbath mode operation vis a vis heating water by saying that during the Sabbath mode operation, either the thermostat is switched off or signals from the thermostat are ignored. Instead the heater is switched on at preset intervals. In the festival mode the same applies, except that the thermostat may be used as fresh water is being heated. However drawing of water while the thermostat is in operation is prevented. Thus the Festival operation mode may a function to fill the tank upon detection of a tank empty condition. In an embodiment, detection of the tank empty condition for the festival mode is a mechanical float. In an alternative embodiment, filling of the tank may be carried out based on fixed quantities. That is to say the tank is filled with a fixed quantity each time.

In one embodiment, a screen may be used to display Sabbath compatibility information so that Sabbath Observant hotel guests for example may be made aware that they can use the facilities.

For general use, a drinks dispenser using the water supply of the present embodiments may include a camera and the camera may allow remote control of the drinks dispenser say from a mobile telephone. A user may be able to turn off the hot water say when small children are around, even if not personally present. Alternatively, the user may be able to remotely instruct small children to place a cup in position and then remotely provide hot water into the cup, say to melt chocolate, prior to filling the cup with cold water, and then instructing the children to approach when the cup is at a safe temperature.

The drinks dispenser may have a touchscreen to program the different modes. The dispenser may for example be provided with different colored LED lights or strips of different colored LED lights and programs of changing colored displays may be provided. Automatic displays of different color lights or different sequences of colors may be added to the festival and Sabbath modes. The lighting sequences may include use of randomized color sequences or the lighting may be set to a fixed color.

As discussed above, the tanks for the drinks may be placed at the level of the dispensing tap so that no pumping is required. However beer is often provided in barrels, and even small barrels may be difficult to accommodate above the level of the tap. A barrel that is below the level of the tap requires pumping and directly operating an electric pump is not allowed on the Sabbath or festivals.

Thus, in order to provide beer on the Sabbath or festivals when pumping is required, an intermediate tank may be provided that is above the level of the tap. Operation of the tap draws beer from the upper tank and does not operate a pump. Separately from the operation of the tap, the upper tank being emptied below a preset level may operate the pump. The pump is not actually operated by the user pressing the tap and thus Sabbath and festival use is permitted.

The following discusses the calculation of the times and the dates.

The Hebrew calendar is neither a solar calendar like the Gregorian calendar, nor a lunar calendar like the Moslem calendar, but is a hybrid lunar-solar calendar, which makes its calculation far from trivial.

The following is a discussion about how to calculate the Hebrew calendar.

The Jewish calendar combines three unconnected astronomical phenomena: the rotation of the Earth about its axis, the day; the revolution of the moon about the Earth, the month; and the revolution of the Earth about the sun, the year. These three phenomena are independent of each other, and there is no correlation between them. The moon revolves around the Earth in about 29½ days. The Earth revolves around the sun in about 365¼ days, that is, about 12 lunar months and 11 days.

To coordinate between the above three phenomena, the Jewish calendar consists of 12 or 13 months of 29 or 30 days, and can be 353, 354, 355, 383, 384 or 385 days long. The centerpiece of the calendar is the new moon, referred to in Hebrew as the Molad.

A new month on the Jewish calendar begins with the Molad. The Molad for the month of Tishri is the most important one for calendar calculations, and is referred to as Molad Tishri.

Note that the calculated Molad does not correspond precisely to the astronomical new moon. The length of time from one astronomical new moon to the next varies somewhat because of the eccentric orbits of the Earth and Moon; however, the calendar Molad is set using a fixed average length of time: 29 days, 12 hours, and 793 parts, commonly written in an abbreviated form: 29 d 12 h 793 p, where the part, or chelek, is a unit of time equal to 3⅓ seconds. There are 18 parts in a minute and 1,080 parts in an hour.

The time for the Molad is Jerusalem local time, which is not the same as the time on the clock, even in Jerusalem, since clocks use the time zone time, not the local time.

Figure 4:
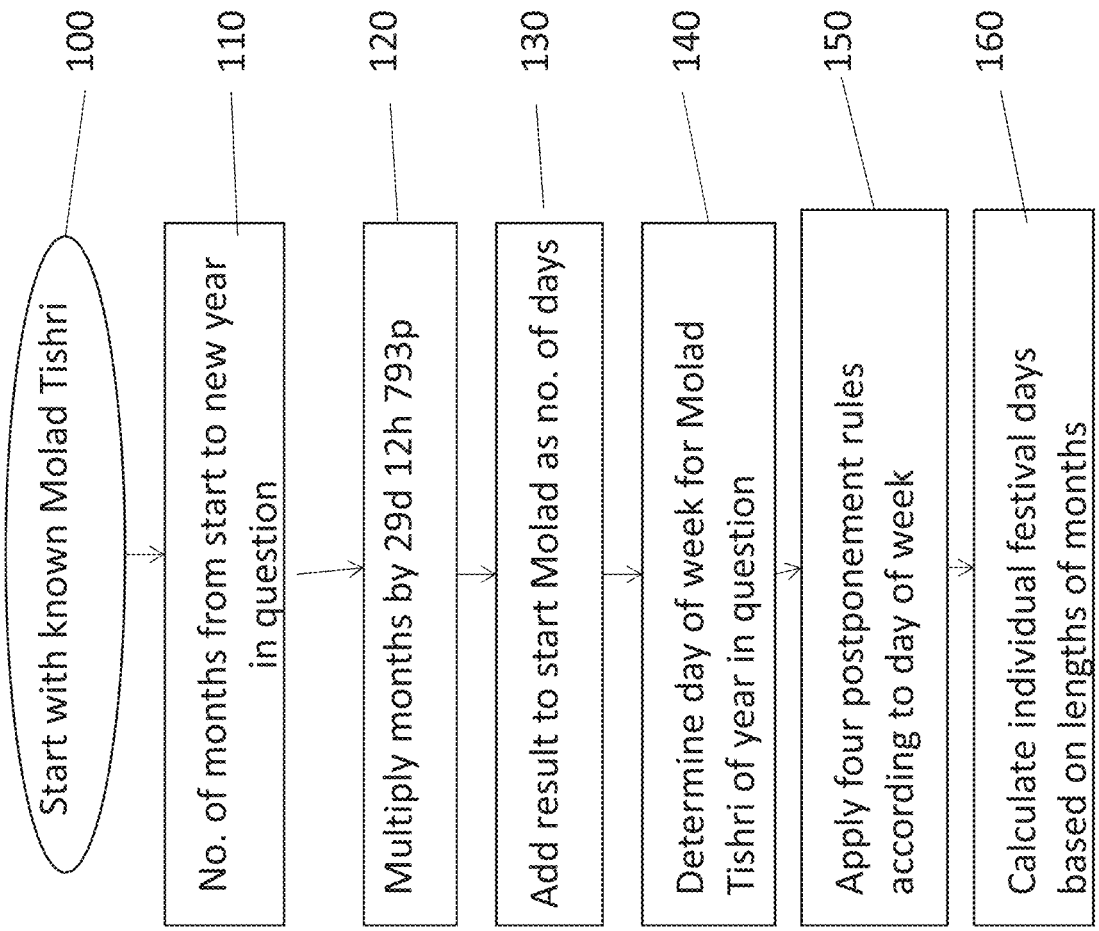
FIG. 4 is a flow chart showing steps in calculating dates of festivals using the Hebrew calendar.

Reference is now made to FIG. 4, which shows the stages involved in calculating the date of the New Year—Rosh Hashanah on the Jewish calendar:

The calculation begins with box 100, taking a known Molad Tishri, the day of the week and the corresponding date in the Gregorian calendar.

In box 110 the calculation determines the number of months between the known Molad and Molad Tishri of the year of interest.

In box 120 the number of months is multiplied by the length of the Molad interval: 29 d 12 h 793 p to give a number of days and fractions of a day.

The result is then added to the known starting Molad as a number of days—box 130.

In box 140 the number of days modulo seven added to the start day of the week gives the day of the week of the Molad Tishri.

In box 150 the four postponement rules are used to determine the actual date to be used for the New Year—Rosh Hashanah for the current year.

In box 160, the secular date is obtained by adding the number of days elapsed, calculated in box 120, to the secular starting date and correcting for intervening leap years.

Box 110 in greater detail requires to determine how many months are between the starting point used and Tishri of the year of your end point. There are exactly 235 months in every 19-year cycle of leap years (12 12-month years plus 7 13-month years), but if the number of years is not evenly divisible by 19, then it is necessary to determine whether each remaining year is a regular year (12 months) or a leap year (13 months).

The leap year cycle is calculated as follows. Leap years occur in years 3, 6, 8, 11, 14, 17 and 19 of a 19-year cycle, and the 19-year cycle begins in the year 1, so you can simply divide the year number by 19 and examine the remainder. If the remainder is 3, 6, 8, 11, 14, 17 or 0 (the 19th year of the cycle) then the year is a leap year. Otherwise, it is not.

In box 120, we multiply the number of months by the average length of the Molad, which is 29 d 12 h 793 p:

Box 130 requires adding the elapsed time calculated above to the starting date to get the ending date.

At this point, we note the number of days elapsed between our starting point and our ending point as a number of days. We note this at this point in the calculation, after the hours are rounded into the days but before the weekday of the starting Molad is added to the number of days. This number of days will be necessary to determine the Gregorian date in box 160.

Box 150 involves applying what are known as postponements or dechiyot, which are needed to find the correct days on which the festivals occur. There are four rules of postponement which postpone the date of Rosh Hashanah, but do not affect the calculated time of the Molad. One of the postponements is a general rule of rounding to ensure the year has a whole number of days, while the rest are designed to prevent oddities in the length of the year and the date of Rosh Hashanah.

Postponement 1: Molad Zakein—General rounding rule.

The first postponement is Molad Zakein, meaning an "old" Molad. If the Molad occurs at or after noon, the Molad is considered to be "old" and we round to the next day. This rule is quite commonly applied, affecting a quarter of all years.

The rule of Molad Zakein simply means that a Molad at or after noon relates to the day that starts at the next sunset, 4-10 hours later, rather than the previous sunset which was 14-20 hours earlier.

Note that when postponements like this apply, a day must be added to the elapsed time for purposes of calculating the Gregorian equivalent date, but the Molad does not change. The unchanged Molad is used for purposes of calculating subsequent years and for certain religious purposes.

Postponement 2: Lo A"DU Rosh

The second postponement is known as Lo A"DU or Lo A"DU Rosh. This rule states that Rosh Hashanah cannot occur on a Sunday, a Wednesday or a Friday. If the calculated Molad occurs on one of these days of the week, Rosh Hashanah is postponed by a day to prevent other problems with the calendar.

This postponement is also commonly applied, as you might imagine. It applies to three out of seven days, so one would expect it to occur almost half of the time.

Note that the postponements of Molad Zakein and Lo A"DU Rosh can work in combination. Thus the rule of Molad Zakein must be checked before the rule of Lo A"DU Rosh.

Postponement 3: Gatarad

The remaining two postponements are much less commonly applied.

Postponement Gatarad holds that if Molad Tishri in a simple 12-month, non-leap, year occurs on a Tuesday at 9 h 204 p or later, Rosh Hashanah is postponed to the next day, a Wednesday, which by the effect of Lo A"DU Rosh would then be postponed to Thursday.

Why does such a complicated rule exist? This rule prevents the possibility that a year might be 356 days, an invalid length. Consider: a Molad Tishri at 3 d 9 h 204 p would not be postponed by Molad Zakein or Lo A"DU Rosh. Add 12 lunar cycles (354 d 8 h 876 p) to the next year's Rosh Hashanah and you get 7 d 18 h 0 p with 354 days elapsed. Molad Zakein applies to the following year, postponing Rosh Hashanah to the next day, a Sunday, with 355 days elapsed. Lo A"DU Rosh is then triggered, postponing Rosh Hashanah and leaving 356 days elapsed and making the current year an invalid length. Gatarad takes days away from the following year and adds them to the preceding year, so both years are a valid length.

Note that Gatarad invariably triggers Lo A"DU Rosh. Gatarad only applies when Rosh Hashanah is Tuesday and Gatarad postpones Rosh Hashanah to Wednesday. Lo A"DU Rosh then postpones Rosh Hashanah to Thursday.

Note also that this rule is not combined with Molad Zakein. If Molad Zakein applies to the current year, Gatarad is unnecessary; thus Gatarad applies only to Molads between 9 h 204 p and 17 h 1079 p.

Postponement 4: Betutkafot

Like Postponement Gatarad, this rule is not very commonly applied and is also designed to prevent a year from having an invalid length. Postponement Betutkafot prevents a leap-year from having 382 days, too few days, by postponing Rosh Hashanah of the non-leap year following the leap year.

If Molad Tishri in a year following a leap year occurs on Monday after the 15th hour and 589 parts, then it is postponed to the next day. The rule is applied only if the actual Molad occurs on Monday, not if it is postponed to Monday. Like Gatarad, the rule really only applies to Molads before noon, because Molad Zakein handles the postponements for Molads at or after noon. Unlike Gatarad, Betutkafot does not trigger Lo A"DU Rosh, because Betutkafot postpones Rosh Hashanah from a Monday to a Tuesday and Tuesday is an acceptable day for Rosh Hashanah.

Microprocessors are typically programmed with the Gregorian date, so a final stage is to determine the Gregorian date, at least for a starting point. Typically, one would calculate the Gregorian date for Rosh Hashanah and work from there. One may take the elapsed days calculated in Step 4, add any additional days triggered by the postponements in Step 5, and add this number of days to the date of Rosh Hashanah for the known Molad.

The principles above are sufficient to convert Rosh Hashanah to a Gregorian date for any year. However, for the remaining festivals, one may calculate either that year's Rosh Hashanah, the following year's Rosh Hashanah or both and use this information to work out the date based on the lengths of months. Additional information relates to the month of the festival being considered.

The following contains information for all of the months, irrespective of whether festivals are involved.

Tishri

Tishri is the month of Rosh Hashanah, so you simply add the date of the month to Rosh Hashanah and subtract 1 (because Rosh Hashanah is Day 1).

Cheshvan

Cheshvan is the second month of the calendar year, and the preceding month of Tishri is always 30 days, so you simply take the current Rosh Hashanah, add 29 days (30–1 for Rosh Hashanah) and add the date of the month.

Kislev

Kislev is the hardest month to calculate. You cannot simply work forward from the current year's Rosh Hashanah, because the preceding month of Cheshvan can be 29 or 30 days, nor can you work backward from the next year's Rosh Hashanah, because Kislev itself can also be 29 or 30 days. To calculate the length of Kislev, you need to know the date of Rosh Hashanah of both the current year and the next year, then calculate the difference between them to determine the length of the current year. If the year is 353, 354, 383 or 384 days, then Cheshvan is 29 days and you can determine a date in Kislev taking the current Rosh Hashanah, adding 58 days, then adding the date of the month. If the year is 355 or 385 days, then Cheshvan is 30 days and you can determine a date in Kislev by taking the current Rosh Hashanah, adding 59 days, then adding the date of the month.

Tevet, Shevat

The remaining months of the year are of unchanging length, but the number of months varies depending on whether the year is a leap year! Tevet and Shevat are best calculated by working backwards from the following year's Rosh Hashanah and subtracting an additional 30 days in a leap year. Tevet's offset in a non-leap year is −266; Shevat's is −237.

Adar, Adar I and Adar II

Adar is always offset −207 from the following Rosh Hashanah; however, in regular years, Adar is the 12th month of the year (starting from Nissan), and in leap years, is known as Adar II and is the 13th month of the year. Adar I, the extra month inserted as the 12th month in leap years, is always offset −237 days from Rosh Hashanah.

Nissan, Iyar, Sivan, Tammuz, Av, Elul

The remaining months of the year are all of unchanging length and not affected by leap years. Simply subtract the appropriate number of days from the following year's Rosh Hashanah and add the date of the month.

Figure 5:
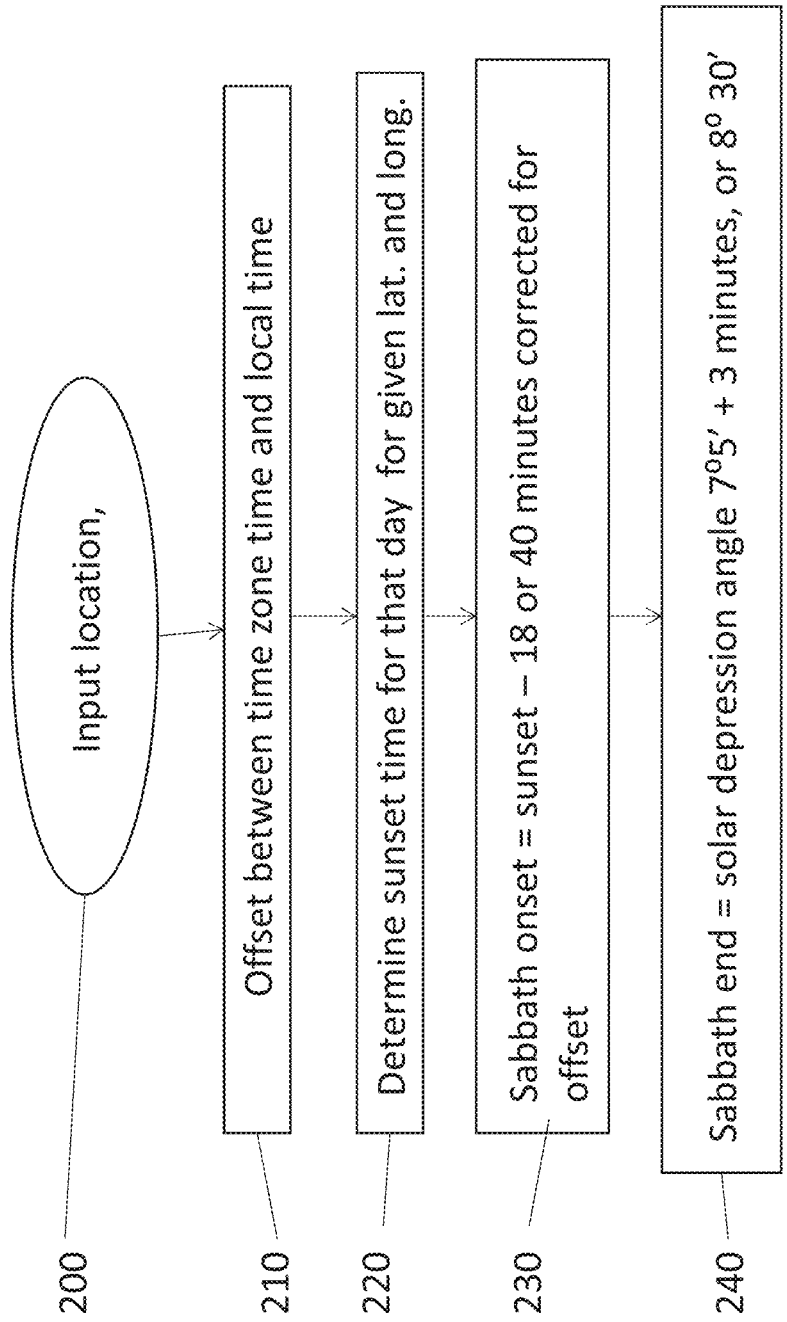
FIG. 5 is a simplified diagram showing how to obtain Sabbath onset and ending times.

Reference is now made to FIG. 5, which illustrates calculation of Shabbat onset times requires longitude and latitude at the location in question. Local time at any given location is an offset of the time zone time being observed which can be obtained using the longitude and latitude, provided in box 200. Published sunset times are not likely to be for either the given location or based on the local time and so cannot be used. Instead an offset is calculated between clock time and actual local time, box 210, and actual sunset times for the given location are calculated in terms of local time—box 220—and then may be converted into the clock time using the offset. The Sabbath onset time is for most locations 18 minutes prior to the local sunset time. In Jerusalem, the Sabbath onset time is 40 minutes prior to the local sunset time—box 230.

The Sabbath ending time is based on a definition of nightfall that depends on the depression angle of the sun below the horizon. Some authorities use a solar depression angle of seven degrees and five minutes, and then add three minutes to the resulting time. Other authorities use a solar depression angle of eight and a half degrees with no time added—box 240.

In practice tables are available of the calendar and of Sabbath times, and numerous programs are available for calculating either. The microprocessor however needs to know the local coordinates and the time according to the local time zone in order to obtain the correct answers.

It is expected that during the life of a patent maturing from this application many relevant actuators and control techniques for refrigeration will be developed and the scope of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A water filter device for filtering water for supply, the water filter device comprising an outer housing, a general water inlet through said housing, a mechanical filter within said housing, a carbon filter within said housing and a general water outlet through said housing, the water filter device providing a flow path from the general water inlet, through the mechanical filter and the carbon filter to the general water outlet, the water filter device comprising a secondary water inlet through said housing between said mechanical filter and said carbon filter, the water filter device providing a second flow path from the secondary water inlet through the carbon filter to the general water outlet, the second flow path thereby bypassing the mechanical filter, the water filter device further comprising a polyphosphate filter within said housing in flow communication with a second water outlet through said housing.

2. The water filter device of claim 1, wherein the general water outlet is upstream of the polyphosphate filter, the water filter device having a polyphosphate filter inlet and a polyphosphate filter outlet providing a third flow path through the polyphosphate filter.

3. A water filter device for filtering water for supply, the water filter device comprising an outer housing, a general water inlet through said housing, a mechanical filter within said housing, a carbon filter within said housing and a general water outlet through said housing, the filter device providing a flow path from the general water inlet, through the mechanical filter and the carbon filter to the general water outlet, the water filter device comprising a secondary water inlet through said housing between said mechanical filter and said carbon filter, the filter device providing a second flow path from the secondary water inlet through the carbon filter to the general water outlet, the second flow path thereby bypassing the mechanical filter, the water filter device further comprising at least one ultra-violet source for sterilizing water, the ultra-violet source operated by drawing of water, first and second valves, and a microcontroller programmed to operate said valves to supply said general water inlet in a weekday operating mode and to close said general water inlet and supply said secondary water inlet in a Sabbath or Festival operating mode.

4. The water filter device of claim 3, wherein the at least one ultra-violet source is deactivated in a Sabbath mode.

5. A water supply unit for supplying water for dispensing as hot and cold water, comprising:
   a water inlet;
   a water filter device for filtering water for supply, the water filter device comprising an outer housing, a general water inlet through said housing, a mechanical filter within said housing, a carbon filter within said housing and a general water outlet through said housing, the water filter device providing a flow path from the general water inlet, through the mechanical filter and the carbon filter to the general water outlet, the water filter device comprising a secondary water inlet through said housing between said mechanical filter and said carbon filter, the water filter device providing a second flow path from the secondary water inlet through the carbon filter to the general water outlet, the second flow path thereby bypassing the mechanical filter; and
   first and second valves controllable to supply said general water inlet in a weekday operating mode and to close said general water inlet and supply said secondary water inlet in a Sabbath or Festival operating mode, the water supply unit further comprising a polyphosphate filter within said housing in flow communication with a second water outlet through said housing.

6. The water supply unit of claim 5, further comprising a hot water tank, controllably connected via a valve to said filter device to be supplied with water in said weekday mode, but not supplied with water for heating in said Sabbath mode.

7. The water supply unit of claim 6, wherein said hot water tank is controllably connected via said valve in a festival mode to be filled on a tank empty condition.

8. The water supply unit of claim 6, further comprising a sterilization function wherein water is held at boiling temperature for a predetermined interval, thereby to provide sterile water.

9. The water supply unit of claim 8, further comprising a sterile tank into which said sterile water is directed for cooling.

10. The water supply unit of claim 6, further comprising a hot tank level reduction sensor for detecting a low water condition of said hot water tank, wherein said Sabbath operation mode comprises a function to stop operating said heater under said low water condition, and a festival mode operation comprises a function to fill said tank under said low water condition.

11. The water supply unit of claim 5, wherein the general water outlet is upstream of the polyphosphate filter, the water filter device having a polyphosphate filter inlet and a polyphosphate filter outlet providing a third flow path through the polyphosphate filter.

12. The water supply unit of claim 5, further comprising at least one ultra-violet source for sterilizing water, the at least one ultra-violet source operated by drawing of water, the source being deactivated in a Sabbath mode.

13. The water supply unit of claim 5, further comprising a controllable bypass for completely bypassing said water filter device.

14. The water supply unit of claim 5, comprising hot and cold water outlets comprising electronic valves bypassed by mechanical taps, said electronic valves being controllable to be disabled in said Sabbath mode.

15. The water supply unit of claim 14, wherein said mechanical taps comprise solenoids respectively, said solenoids being configured to disable said mechanical tap in said weekday festival mode while water in said tank is being heated by said heater and/or while said tank is being filled.

16. The water supply unit of claim 5, wherein said water supply unit comprises a controller, said controller being part of a smart building control system.

17. The water supply unit of claim 16, having a user screen, said controller being configured to display information on said screen.

18. The water supply unit of claim 5, being a self-standing water dispenser.

19. The water supply unit of claim 5, further comprising a chiller unit for dispensing chilled water.

20. The water supply unit of claim 19, wherein said chiller unit is connected to said water inlet via said mechanical filter, at least one ultra-violet radiation source and a carbon filter in said weekday mode, said connection bypassing said mechanical filter in said Sabbath mode.

21. The water supply unit of claim 5, further comprising a soda attachment for carbonating cold water prior to dispensing.

* * * * *